March 21, 1933.  L. L. FOSS  1,902,439
FLYING WORM STEAM MOTOR
Filed Dec. 30, 1930
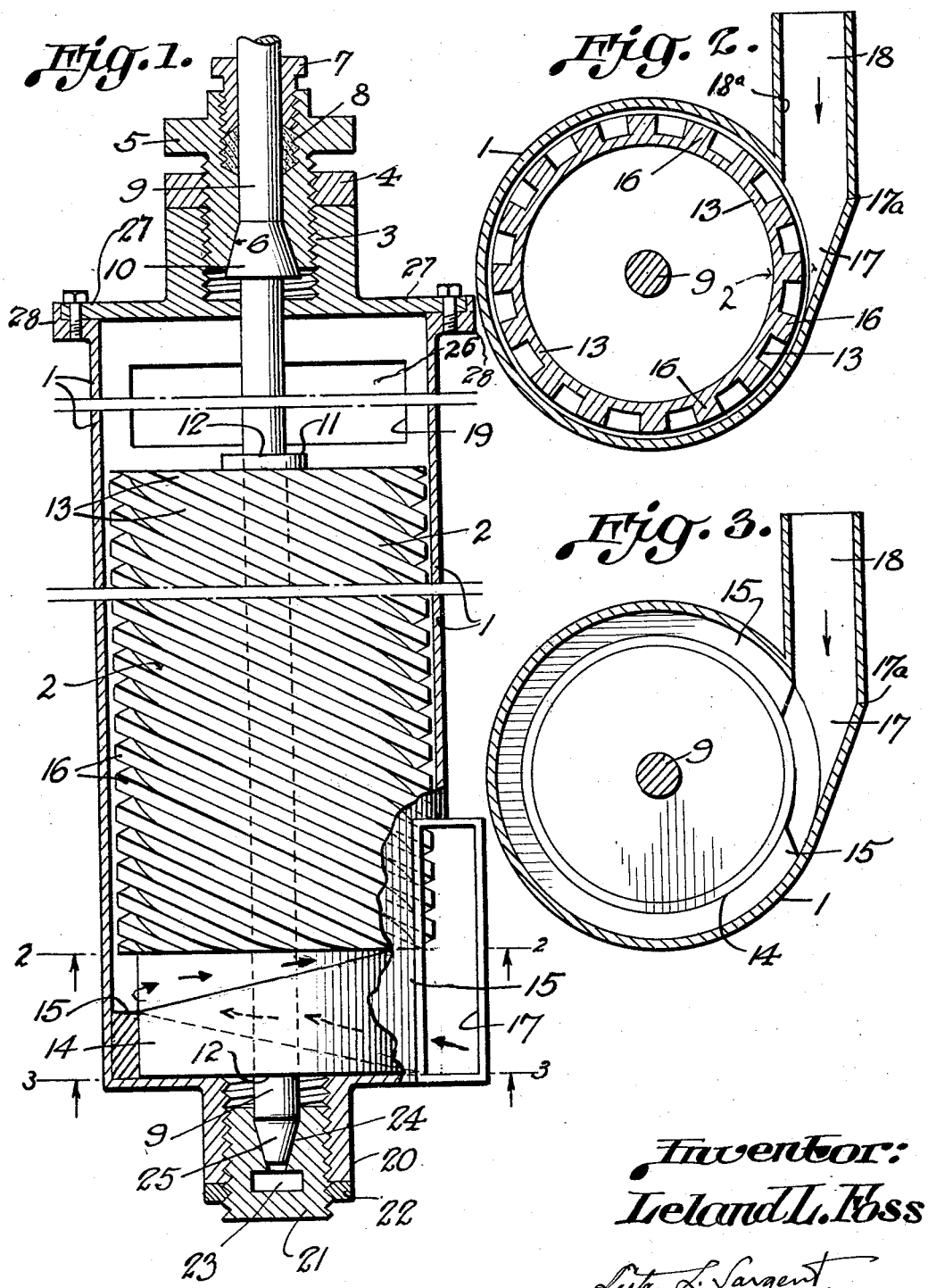
Inventor:
Leland L. Foss
by Lester L. Sargent
Atty.

Patented Mar. 21, 1933

1,902,439

UNITED STATES PATENT OFFICE

LELAND L. FOSS, OF STATESBORO, GEORGIA, ASSIGNOR, BY DIRECT AND MESNE ASSIGNMENTS, OF FOURTEEN PER CENT TO EDWARD T. SKEFFINGTON, FOURTEEN PER CENT TO BERT H. DE LOACH, AND THREE PER CENT TO ARTHUR H. BARRINGTON, ALL OF SAVANNAH, GEORGIA, FOURTEEN PER CENT TO LEE V. GRAHAM, OF CHATHAM COUNTY, GEORGIA, AND FIVE PER CENT TO SAM J. FOSS, OF STATESBORO, GEORGIA

FLYING WORM STEAM MOTOR

Application filed December 30, 1930. Serial No. 505,604.

The object of my invention is to provide a novel steam motor having a drum cylinder with a worm cast thereon and a casing in which the worm is mounted and means for supplying steam to one end of the worm to drive same and thereby to drive a power shaft on which the drum cylinder is mounted.

It is a further object of my invention to provide a bearing for the shaft which will automatically take up wear and properly center the drum at all times.

It is also an object of my invention to provide a steam motor of this type in which the casing and worm are preferably arranged in a vertical position and steam delivered to the bottom end of the worm casing and exhausted from the top end of the worm casing.

It is also an object of my invention to provide a motor casing structure so arranged as to permit of convenient removal of the worm for repairs when necessary.

It is an especial object of my invention to provide a motor which can be operated successfully at extremely high speeds to produce a large amount of horsepower.

It is also an object of my invention to provide a motor of this type in which the blades of the worm are positioned at a pitch best adapted to produce the greatest power and having the worms closely spaced, the passages between the worms forming the steam channels being of a size adapted for the most efficient operation of the motor.

I attain these and other objects of my invention by the mechanism illustrated in the accompanying drawing, in which—

Figure 1 is a vertical section through my invention;

Fig. 2 is a transverse section on line 2—2 of Fig. 1; and

Fig. 3 is a transverse section on line 3—3 of Fig. 1.

Like numerals designate like parts in each of the several views.

Referring to the accompanying drawing, I provide a cylindrical motor casing 1 in which is mounted a drum or hub cylinder 2, having closely spaced worm teeth 16, with intervening spiral steam channels 13. The drum 2 is welded on a shaft 9, which shaft is provided with a tapered or conical lower end 25, seated in a conical recess 24 of the lower bearing 21, said recess opening into a chamber 23 to admit of adjustment of the shaft as wear takes place. The bearing 21 is screw-threaded and mounted in the interiorly threaded end portion 20 of the motor casing, and suitably fastened by the nut 22. The upper end of shaft 9 is provided with a tapered or conical portion 6 which seats in a correspondingly conical recess in the bearing 5. Bearing 5 is screw-threaded and seated in the interiorly threaded casing end 3, which has portions 27 projecting over the flanges 28 outturned from casing 1 and bolted together as shown, to permit removal for purposes of making repairs. I provide a suitable nut 4 for securing bearing 5 in place. I also provide packing 8 and a packing nut 7, as shown, or equivalent lubrication means.

At the lower end of the casing 1, I provide a steam inflow passage 17, and at the upper end of the casing I provide a suitable steam exhaust passage 26, arranged laterally of the casing.

Mounted in the lower portion of the cylindrical casing 1 and fastened on the inside wall thereof I provide a circular wedge-like steam guide member 15 adapted to guide the steam to the open ends of the steam channels 13 formed by the spiral blades or worms 16 of the motor drum, the steam following the path indicated by arrows in Fig. 1 of the drawing. The large end of the wedge-like steam guide member 15 just escapes the open ends of the worm channels, and extends from the blade portion of the drum 2 to the bottom of the cylindrical casing 1, tapering to a blade edge at its other end. It thus conducts the steam tightly into the worm channels, that is, under great pressure, giving greater force to the motor and functioning to increase the rapidity of operation of the motor. The member 15 is affixed to and stationary with the casing 1, and does not rotate with the member 14 which it encircles. The passage indicated by the arrows in Fig. 1 is in communication with the inflow steam passages 17 and 18.

I provide a main inflow steam passage 18 having an elbow at 17a and terminating in a restricted or reduced passage 17 for the inflow of steam as shown in Figs. 1, 2, and 3. An important feature of my invention is the positioning of the wall 18a of the steam passage 18 in alignment with the peripheral or outer wall of the drum 2 forming the base of the steam channels 13, as shown in Fig. 2.

In operation the steam flows in under pressure through passage 18 and through restricted passage 17 over the wedge-like steam guide member 15 in the channel indicated by the arrows in Fig. 1 of the drawing and to the lower ends of the steam worm channels 13 which are disposed spirally about the drum 2. I provide worm blades 16 arranged at a pitch of approximately 25 degrees, it being required for successful operation of the motor that the pitch be between approximately 20 degrees and approximately 80 degrees, this pitch of the blades and of the corresponding intervening steam channels 13 having been found by experiment to produce the best results.

The steam is directed to the outer edge of the cylinder by the tangential steam passage or trunk 18, the wall 18a of which is aligned with the outer wall of the drum 2, thereby directing the full force of the steam on the worms 16 and greatly increasing the power of the motor. I may use any suitable number of blades on the drum or hub cylinder 2, ranging from 4 to 24 threads under ordinary conditions. In very large cylinders it might be desirable to use as many as 48 threads or worms.

While I prefer to arrange the motor in a vertical position it may, if desired, be disposed in a horizontal position. By positioning the motor in a vertical position, as shown in Fig. 1, with the steam inlet at the bottom or lower portion of the casing 1, the steam functions to partly support the weight of the drum or hub cylinder 2 and thereby greatly reduces friction. The conical portions 25 and 6 of the main shaft 9 automatically take up wear and permit of proper centering of the shaft in spite of wear.

The inflow of steam is from two to three times that of the outlet between the worms, and after the steam comes out between the worms at the upper end of the casing it enters into the exhaust passage which is some ten to fifteen times greater than the output from between the worms 16.

It is within the contemplation of my invention to provide suitable lubrication means, such as oil cups for oiling the shaft 9.

The inflow passages 18 and 17 are rectangular (or if desired square) in cross section, the outer wall of the reduced end 17 being slantingly disposed to aline the wall of the steam passage with the wall of the cylinder casing 1 at its juncture with same, and it extends down over several of the worm threads to deliver steam to a plurality of the worm channels, as shown in Fig. 1, whereby the steam pressure is utilized to the best advantage in driving the worm.

It is within the contemplation of my invention to utilize a suitable water cooling mechanism or a suitable air cooling mechanism in connection with the cylindrical casing 1, should such a cooling system be found desirable or necessary.

As indicated in Fig. 1 of the drawings, the drum 2 has a hub end 11, and is welded at 12 (at either end) to the shaft 9, that shaft being supported by the bearings 5 and 21 respectively at either end of the shaft. The drum 2 is normally hollow, but in small sizes of the machine may perhaps be made solid and integral with shaft 9.

The spiral blades or worms 16 extend around the hub cylinder or drum 2 from one to three times, as I may desire, in order to give full force and fully utilize the power of the motive fluid.

What I claim is:

1. In a worm steam motor, the combination of a cylindrical casing, bearings on the ends of the casing, a shaft rotatably mounted in said bearings, a drum welded on the shaft, spiral blades integral with the drum and extending to the inside wall of the casing to provide spiral steam channels intervening between the worm blades, a wedge-like steam guide member affixed to the inside wall of the motor casing below the drum and guiding the inflowing steam to the open lower ends of the spiral steam channels of the drum, means for conducting steam to the lower portion of the casing and directly into the mouths of the steam spiral channels, means for discharging exhaust steam from the upper portion of the casing after passing through the steam channels of the drum, the means for conducting steam to the lower portion of the casing comprising a passage having one wall thereof aligned with the periphery of the adjacent portion of the drum, the end of the steam passage being of restricted size to increase the speed and power of the steam current applied to the worm blades of the drum.

2. In a worm steam motor, the combination of a cylindrical casing, a shaft rotatably mounted in the casing, a drum mounted on the shaft and slightly smaller than the casing, a series of spiral blades of uniform size throughout mounted on the drum, means for conducting steam to the lower end of the drum and into the channels between the spiral blades to rotate the drum, means for the exhaust of the steam at the top of the casing, a circular wedge-like steam guide member positioned at the lower end of the casing and positioned to conduct the inflowing steam in a circular path to the channels intervening between the spiral blades of the drum, said steam guide member being affixed to the inside wall of the casing and remaining stationary relative to the rotating drum to concentrate the current of steam under pressure on the steam channels of the worm drum.

LELAND L. FOSS.